M. J. WALD.

COASTER BRAKE FOR BICYCLES, MOTOR CYCLES, OR THE LIKE.

APPLICATION FILED APR. 14, 1915.

Reissued July 13, 1915. 13,946.

2 SHEETS—SHEET 1.

Witnesses,
F. V. Brooks
F. D. Connor.

Inventor
M. J. Wald

By Carl P. Goepel
Attorney

M. J. WALD.

COASTER BRAKE FOR BICYCLES, MOTOR CYCLES, OR THE LIKE.

APPLICATION FILED APR. 14, 1915.

Reissued July 13, 1915.

13,946.

2 SHEETS—SHEET 2.

Witnesses
F. V. Brooks
J. D. Connor.

By

Inventor
M. J. Wald
Carl P. Goepel
Attorney.

UNITED STATES PATENT OFFICE.

MICHAEL J. WALD, OF EUGENE, OREGON.

COASTER-BRAKE FOR BICYCLES, MOTOR-CYCLES, OR THE LIKE.

13,946. Specification of Reissued Letters Patent. Reissued July 13, 1915.

Original No. 1,058,280, dated April 8, 1913, Serial No. 605,203. Application for reissue filed April 14, 1915. Serial No. 21,486.

*To all whom it may concern:*

Be it known that I, MICHAEL J. WALD, a citizen of the United States, residing at Eugene, in the county of Lane and State of Oregon, have invented certain new and useful Improvements in Coaster-Brakes for Bicycles, Motor-Cycles, or the like; and I do hereby declare the following to be a full, clear, and exact description of the invention, such as will enable others skilled in the art to which it appertains to make and use the same.

This invention relates to new and useful improvements in coaster-brakes for bicycles, motor-cycles or the like, and has for an object the provision of a device of this character which will be positive in action, comparatively simple and cheap to manufacture, reliable and efficient in use, and readily operated.

With the above and other objects in view, this invention resides in the novel features of construction, formations, combinations and arrangements of parts to be hereinafter more particularly described, claimed, and illustrated in the accompanying drawings, in which—

Figure 1:
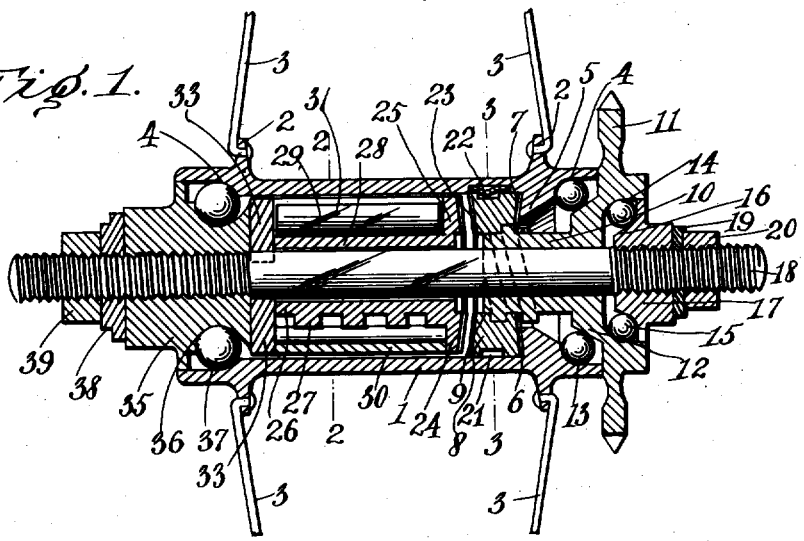
Figure 2:
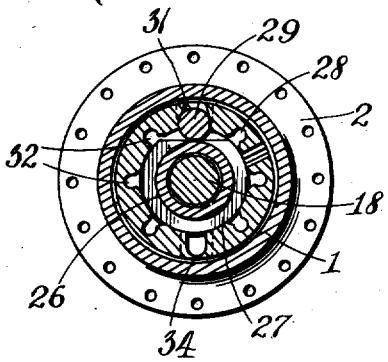
Figure 3:
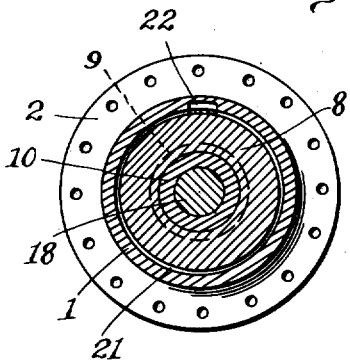
Figure 4:
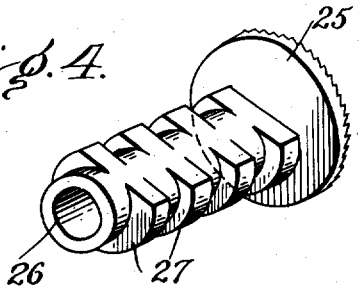
Figure 5:
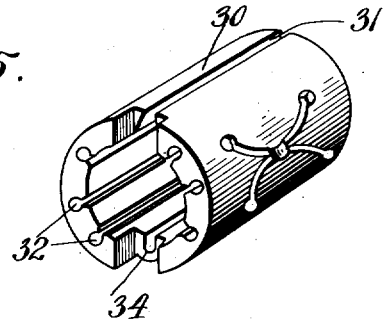
Figure 7:
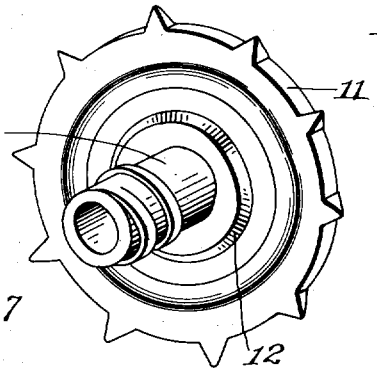
Figure 6:
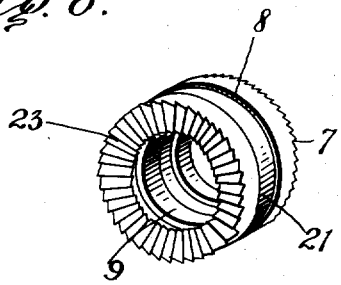
Figure 8:
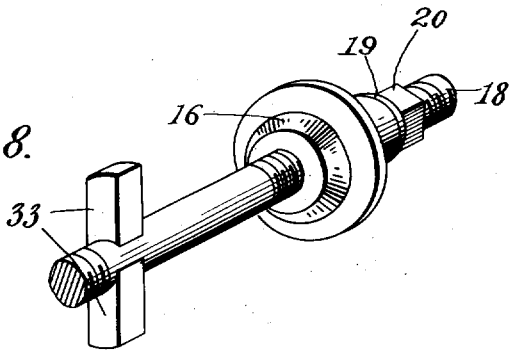

Figure 1 is a longitudinal sectional view of my invention; Fig. 2 is a sectional view on the line 2—2 of Fig. 1; Fig. 3 is a sectional view on the line 3—3 of Fig. 1; and Figs. 4, 5, 6, 7 and 8 are detail perspective views of the operating sleeve, brake shoe, bur, sprocket and axle detached.

Referring to the drawing by characters of reference, the numeral 1 designates generally the shell or outer hub of a wheel or the like, provided with the customary annular spoke-supporting flanges 2 in which are secured the spokes 3 of the wheel, the outer ends of which are attached to the customary rim (not shown). The outer ends of the shell are provided with halves 4 of ball races, adjacent one of which is formed an inwardly extending flange 5, upon one face of which is formed a series of ratchet teeth 6, adapted to engage the teeth 7 formed upon the slidable bur 8, the inner periphery of which is threaded as at 9 for engagement with a worm 10 extending inwardly within the shell 1, from one face of a sprocket wheel 11. A shoulder 12 is formed upon this sprocket wheel 11 adjacent the worm 10, and is adapted to engage the offset side of the balls 13 carried within the above-mentioned half of the ball race 4. The offset side of this sprocket 11 is provided with a centrally located groove 14, adapted to receive a number of ball bearings 15, the opposite sides of which rest within a ball race 16 carried by a bearing sleeve 17, located upon one end of the axle 18 and retained in place by a washer 19 and lock nut 20 respectively.

The bur 8 is provided with an outer peripheral groove 21, adapted to receive a spring 22, which serves normally to hold the teeth 7 of the said bur in spaced relation to the teeth 6 of the inwardly projecting flange 5. The end of the bur opposite to the one which is toothed, as at 6, is provided with a series of similar teeth 23, adapted to engage teeth 24, supported upon a disk 25 mounted upon one end of a sleeve 26 carried by the axle 18 when the bur 8 is in a position away from the flange 5. The sleeve 26 is provided with a series of raised bearing rings 27, while one side of the said sleeve is flattened, as at 28, and adapted to engage a roller 29, which is interposed between said flattened face and the inner wheel of the shell 1.

A brake shoe 30 surrounds the sleeve 26 and roller 29, and is provided in one edge with a longitudinally extending substantially V-shaped slot 31, into which the roller 29 is adapted to be forced upon the proper rotation of the sleeve 26, for the purpose of spreading the said brake shoe and forcing it into engagement with the inner surface of the shell 1, which operation is aided by the means of a series of internal longitudinally extending grooves 32, which are formed within the brake shoe for the purpose of rendering the material composed therein resilient.

The axle 18 is provided with a pair of diametrically located oppositely extending lugs 33, which are adapted to engage recesses 34 formed in the end of the brake shoe 30, for the purpose of keying the same to the said axle and causing it to rotate therewith.

A suitable bearing cap 35 is located upon the end of the axle 18, and is provided with one-half 36 of a ball race, which engages the ball bearings 37, mounted in the opposite half 4 of the said race. This cap is retained upon the axle against displacement by means of a washer 38 and nut 39.

From the foregoing disclosure it will be manifest that when the bur 8 is in engagement with the teeth 6, the said shell or hub 1 will be rotated upon the proper turning of the sprocket wheel 11. The opposite movement of the said sprocket 11 will cause the bur 8 to move into engagement with the spring 22, which will cause the shell or hub 1 to turn loosely upon the axle 18, while upon a further backward movement of the said sprocket 11 the bur 8 will be thrown into engagement with the teeth 24 of the disk 25, and cause the sleeve 26 to rotate, forcing the roller 29 into the V-shaped slot 31 of the brake shoe 30, causing the same to expand and frictionally engage the inner surface of the shell or hub 1 and prevent the same from rotating.

From the foregoing disclosure it will be obvious that a coaster-brake of the character previously described is provided for which will fulfil all of the necessary requirements of such a device.

Having thus fully described this invention, what I claim as new and desire to secure by Letters Patent is:—

1. In a brake mechanism the combination of an axle, a hub shell, bearings between said axle and shell, a sleeve on said axle flattened on one side, an expansible split cylindrical brake-shoe disposed on said sleeve and having a longitudinal outwardly tapered slot extending throughout its length, a spreading roller for said brake-shoe disposed in said slot and on the flattened side of said sleeve, and means mounted on said axle for actuating said sleeve.

2. In a brake mechanism the combination of an axle, a hub shell provided with an internal flange, bearings between said axle and shell, a sleeve on said axle flattened on one side and provided with a disk, an expansible split cylindrical brake-shoe disposed on said sleeve and having a longitudinal outwardly tapered slot extending throughout its length, a spreading roller for said brake-shoe disposed in said slot and on the flattened side of said sleeve, and means mounted on said axle for actuating said sleeve, said means comprising a sprocket on said axle provided with an extended hub having a worm, and a slidable bur engaged by said worm and engaging at its opposite ends said flange or disk.

3. In a brake mechanism the combination of an axle, a hub shell provided with a recess on its inner face, bearings between said axle and shell, a hub engaging sliding bur disposed within said shell and provided with a peripheral groove, a spring disposed in said recess and engaging said groove to hold said bur in spaced relation to the hub, and means for shifting said bur into and out of engagement with the hub.

4. In a brake mechanism the combination of an axle, a hub shell, bearings between said axle and shell, a sleeve on said axle having a series of raised bearing rings, flattened on one side, an expansible split cylindrical brake-shoe disposed on said sleeve and having a longitudinal outwardly tapered slot extending throughout its length, a spreading roller for said brake-shoe disposed in said slot and on the flattened side of said sleeve, and means mounted on said axle for actuating said sleeve.

5. In a brake mechanism the combination of an axle, a hub shell, bearings between said axle and shell, a brake mechanism on the inside of said shell, said brake having a ratchet mounted on said axle, said shell having another ratchet, at the end thereof, opposite to said brake and the ratchet of said brake, and a sliding bur intermediate the said ratchets of said brake and of said shell, and having ratchet faces on both sides thereof adapted to alternately engage the ratchets of said brake and of said shell, and resilient means for maintaining said bur intermediate the said ratchets of said brake and said shell and spaced from one of the said ratchets, and means for moving said bur between said ratchets of said brake and of said shell.

6. In a brake mechanism the combination of an axle, a hub shell, bearings between said axle and said shell, a brake mechanism on the inside of said shell, said brake having a ratchet revolving about said axle, said shell having another ratchet, at the end thereof, opposite to said brake and the ratchet of said brake, a sliding bur intermediate the said ratchets of said brake and of said shell, and having ratchet faces on both sides thereof adapted to alternately engage and mesh with the ratchets of said brake and of said shell, a sprocket wheel revolubly mounted on said axle and having a sleeve on said axle projecting into said shell and provided with an external screw threading thereon in the interior of said shell, said bur being internally threaded so as to coöperate with the said screw threading of said sleeve, and yieldable means for maintaining the said bur intermediate the said ratchets of said brake and said shell and spaced from one of said ratchets, said means being sufficiently yielding to permit the actuation of said bur in either direction by the revolution of said sleeve, to mesh with one of said ratchets, whereby when the sleeve is revolved in one direction, the said bur meshes with one of said ratchets, and when said sleeve is revolved in the opposite direction, said bur meshes with the other of said ratchets.

MICHAEL J. WALD.

Witnesses:
LOUIS E. BEAN,
E. A. BEAN.